US012668296B2

(12) United States Patent
Buzzard et al.

(10) Patent No.: US 12,668,296 B2
(45) Date of Patent: Jun. 30, 2026

(54) STEERING COLUMN ANTI-ROTATION ASSEMBLY

(71) Applicant: Steering Solutions IP Holding Corporation, Saginaw, MI (US)

(72) Inventors: Donald A. Buzzard, Saginaw, MI (US); Michael P. Anspaugh, Bay City, MI (US); Matthew Jt Vincent, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 295 days.

(21) Appl. No.: 18/507,401

(22) Filed: Nov. 13, 2023

(65) Prior Publication Data

US 2025/0155075 A1    May 15, 2025

(51) Int. Cl.
*B62D 1/184*        (2006.01)
*B62D 1/16*        (2006.01)

(52) U.S. Cl.
CPC ............... *B62D 1/184* (2013.01); *B62D 1/16* (2013.01)

(58) Field of Classification Search
CPC ................................. B62D 1/16; B62D 1/184
USPC .......................................................... 70/182
See application file for complete search history.

(56) References Cited

U.S. PATENT DOCUMENTS

| | | | | | |
|---|---|---|---|---|---|
| 1,076,835 | A | * | 10/1913 | Lyons | B60R 25/02113 70/185 |
| 1,095,569 | A | * | 5/1914 | Glenn et al. | B60R 25/02113 70/185 |
| 1,118,580 | A | * | 11/1914 | Pohler | B60R 25/02113 70/185 |
| 1,137,742 | A | * | 5/1915 | Coyner | B60R 25/02113 70/185 |
| 1,359,213 | A | * | 11/1920 | Welch | B60R 25/02147 70/183 |
| 1,436,416 | A | * | 11/1922 | Tamburini | B60R 25/02113 70/183 |
| 1,442,605 | A | * | 1/1923 | Crandall | B60R 25/02113 70/183 |
| 4,771,618 | A | * | 9/1988 | Weber | B60R 25/0211 70/252 |
| 4,773,241 | A | * | 9/1988 | Peitsmeier | B60R 25/02126 70/252 |
| 4,776,189 | A | * | 10/1988 | Weber | B60R 25/02147 70/252 |
| 5,765,408 | A | * | 6/1998 | Sanseverino | B60R 25/02147 70/237 |
| 5,887,463 | A | * | 3/1999 | Bobbitt, III | B60R 25/02134 70/252 |
| 6,393,880 | B1 | * | 5/2002 | Vance, Sr. | B64C 13/14 70/183 |

(Continued)

FOREIGN PATENT DOCUMENTS

DE        202013009280 U1 *  1/2015  ............... B62D 1/16

*Primary Examiner* — Nathan Cumar
(74) *Attorney, Agent, or Firm* — Dickinson Wright PLLC

(57)        ABSTRACT

An anti-rotation assembly for a vehicle steering column includes a handle portion extending from a first end to a second end, the first end having a handle and the second end having a housing segment. The anti-rotation assembly also includes a lock pin, wherein the lock pin extends from a first end to a second end, the first end disposed within the housing segment of the handle portion and the second end extending through a hole defined by a steering column to rotationally lock the steering column.

15 Claims, 5 Drawing Sheets

(56) References Cited

U.S. PATENT DOCUMENTS

| | | | |
|---|---|---|---|
| 8,438,944 B2 * | 5/2013 | Ridgway ................ | B62D 1/195 |
| | | | 74/495 |
| 9,663,136 B2 * | 5/2017 | Stinebring ............ | B62D 1/195 |
| 10,093,339 B2 * | 10/2018 | Bodtker ................ | B62D 1/187 |
| 10,344,507 B2 * | 7/2019 | King .................... | B60R 25/023 |
| 10,640,140 B2 * | 5/2020 | Collier .................. | F16D 11/00 |
| 11,204,082 B2 * | 12/2021 | Bonkowski ........... | B62D 5/001 |
| 11,279,393 B2 * | 3/2022 | Jacobs ................. | B62D 1/187 |
| 11,407,438 B2 * | 8/2022 | Schneider ............. | B62D 1/184 |
| 2011/0174109 A1 * | 7/2011 | Fasone .................. | B60R 25/00 |
| | | | 70/182 |
| 2015/0168988 A1 * | 6/2015 | Buzzard .................. | B62D 1/16 |
| | | | 74/495 |
| 2019/0077438 A1 * | 3/2019 | Collier .................. | B62D 1/185 |
| 2021/0245792 A1 * | 8/2021 | Jones ...................... | G05G 1/04 |
| 2022/0266890 A1 * | 8/2022 | Buzzard ................ | B62D 1/184 |

* cited by examiner

STEERING COLUMN ANTI-ROTATION ASSEMBLY

FIELD OF THE INVENTION

The embodiments disclosed herein relate to vehicle steering systems and, more particularly, a steering column anti-rotation assembly.

BACKGROUND

Vehicle steering systems often require a device that inhibits rotation of the steering column shaft line until a certain stage of the vehicle assembly process. The steering column manufacturer typically ensures that the rotational position is maintained until the desired assembly process stage. One example of an anti-rotation device is a steel member inserted into the steering column structure to maintain the constant steering shaft rotational orientation. At some point before the vehicle is fully assembled, this device is removed to allow vehicle steering function. However, prior anti-rotation devices utilize a large amount of material and do not always provide a smooth insertion or removal process. For example, a metal pin with a large over-mold section, a large, bent metal pin snap fit to a plastic segment, or a long metal pin with a zip tie attached thereto may be utilized. Each of these designs require a long metal pin that extends well beyond the distance necessary for the load being carried to prevent rotation of the steering shaft line, thereby resulting in excessive metal material being used and overall cost.

SUMMARY

According to one aspect of the disclosure, an anti-rotation assembly for a vehicle steering column includes a handle portion extending from a first end to a second end, the first end having a handle and the second end having a housing segment. The anti-rotation assembly also includes a lock pin, wherein the lock pin extends from a first end to a second end, the first end disposed within the housing segment of the handle portion and the second end extending through a hole defined by a steering column to rotationally lock the steering column.

According to another aspect of the disclosure, an anti-rotation assembly for a vehicle steering column includes a handle portion extending from a first end to a second end, the first end having a handle and the second end having a housing segment. The anti-rotation assembly also includes a lock pin, wherein the lock pin extends from a first end to a second end, the first end disposed within the housing segment of the handle portion and the second end extending through a hole defined by a steering column to rotationally lock the steering column, wherein the first end of the lock pin includes a plurality of barbs, wherein at least one of the barbs is in contact with a plurality of retention features located within the housing segment of the handle portion to retain the lock pin within the housing segment, wherein the lock pin has a length less than three-fourths (¾) of the length of the handle portion.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

The following discussion is directed to various embodiments of the disclosure. Although one or more of these embodiments may be described in more detail than others, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
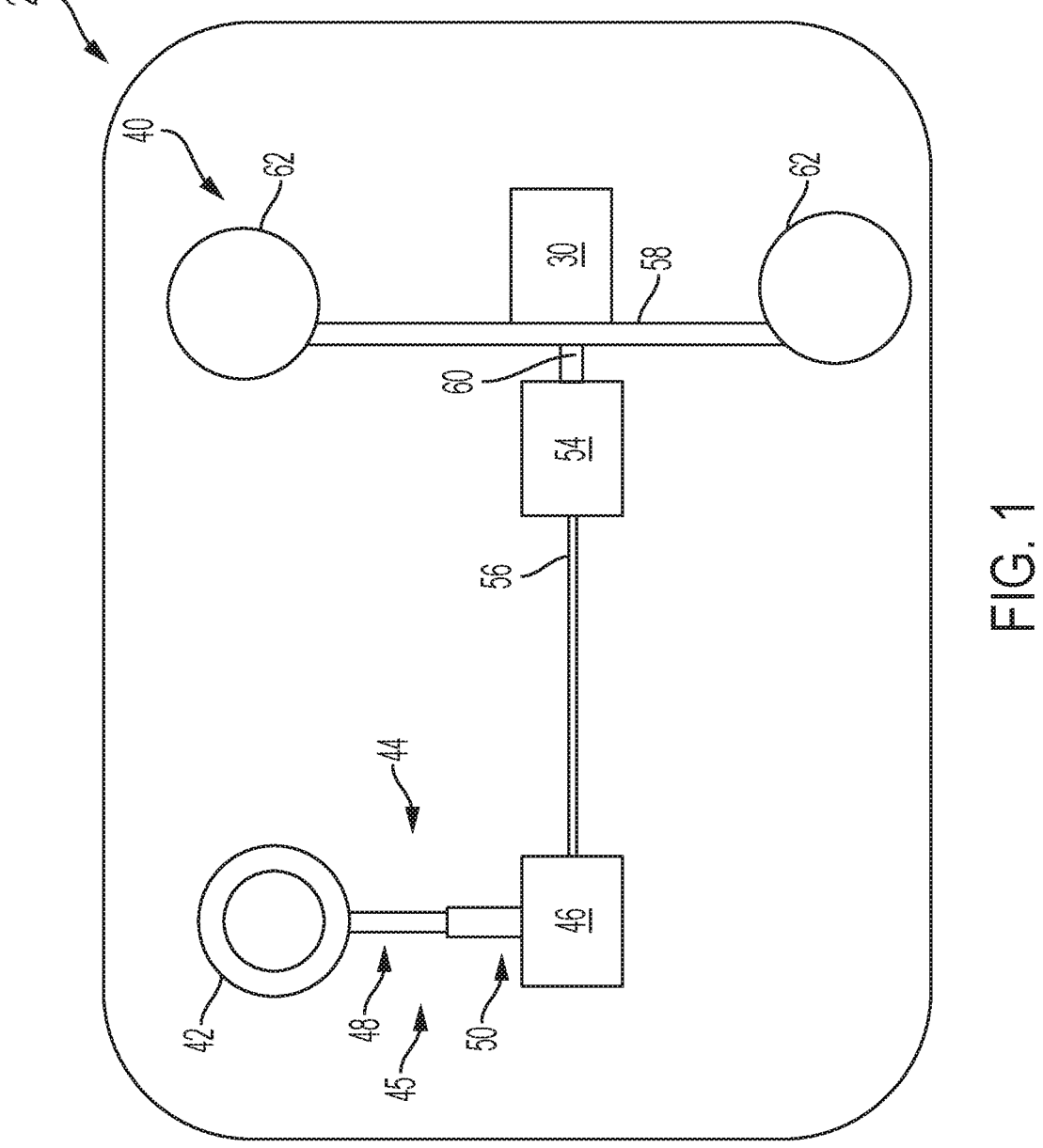
FIG. 1 is a schematic illustration of a vehicle steering system.

Referring initially to FIG. 1, a vehicle 20 is generally illustrated according to the principles of the present disclosure. The vehicle 20 may include any suitable vehicle, such as a car, a truck, a sport utility vehicle, a mini-van, a crossover, any other passenger vehicle, any suitable commercial vehicle, or any other suitable vehicle. While the vehicle 20 may be a passenger vehicle having wheels and for use on roads, the principles of the present disclosure may apply to other vehicles, such as planes, tractors, boats, or other vehicles. The vehicle 20 may include a propulsion system 30, such as an ignition system, an electronic system, or combinations thereof.

The vehicle 20 further includes a steering system 40. The steering system 40 may be configured as a driver interface steering system, an autonomous driving system, or a system that allows for both driver interface and autonomous steering. The steering system 40 may include an input device 42, such as a steering wheel, wherein a driver may mechanically provide a steering input by turning the steering wheel. A steering column assembly 44 includes a steering column 45 that extends along an axis from the input device 42 to an output assembly 46. The output assembly 46 may include a pinion shaft assembly, an I-shaft, a cardan joint, steer-by-wire components or any feature conventionally located opposite the input device 42.

The steering column 45 may include one or more axially adjustable portions, for example, an upper jacket 48 and a lower jacket 50 that are axially adjustable with respect to one another. It is to be appreciated that other structural features of the steering column 45 may be part of the upper jacket 48 and the lower jacket 50, such as brackets, rails, other devices, or combinations thereof.

A steering gear assembly 54, the output assembly 46 and the steering input device 42 may be connected via a steering shaft assembly 56. The steering gear assembly 54 may be configured as a rack-and-pinion, a recirculating ball-type steering gear, or any other types of steering gears associated with autonomous and driver-interface steering systems. The steering gear assembly 54 may then connect to a driving axle 58 via an output shaft 60. The output shaft 60 may include a pitman arm and sector gear and/or various traditional components. The output shaft 60 is operably connected to the steering gear assembly 54 such that a rotation of the steering shaft assembly 56 causes a responsive movement of the output shaft 60 and causes the drive axle to turn wheels 62. It is to be appreciated that the steering components described herein may be part of a steer-by-wire system or one which includes a direct mechanical linkage over the span of the components.

Figure 2:
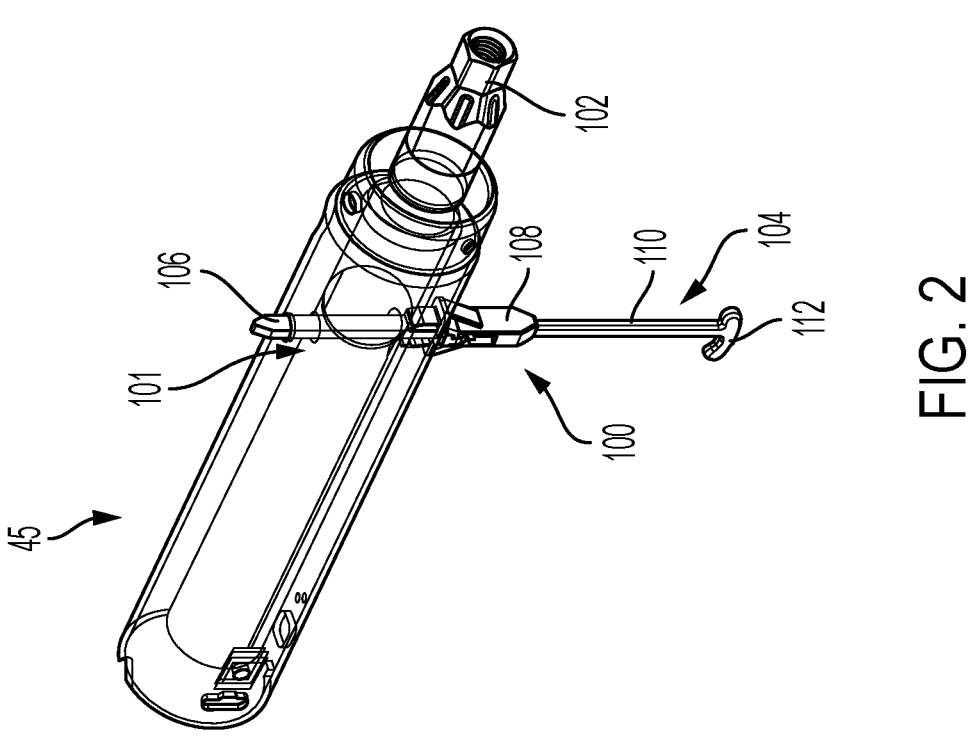
FIG. 2 is a perspective view of a steering column anti-rotation assembly in an installed position.

Referring to FIG. 2, a portion of the steering column 45 is illustrated with an anti-rotation assembly 100 in an installed position to prevent rotation of the illustrated portion of the steering column 45. In particular, the anti-rotation assembly 100 prevents rotation of a steering shaft 102 disposed within a jacket, such as the upper jacket 48, for example.

The anti-rotation assembly 100 includes a handle portion 104 and a lock pin 106. The handle portion 104 includes a housing segment 108 which retains a portion of the lock pin 106 therein to securely connect the handle portion and the lock pin 106. The lock pin 106 extends through a hole 101 defined by the steering shaft 102 and the steering column 45. As shown, the handle portion 104 includes an elongated segment 110 extending between a handle 112 and the housing segment 108. The handle 112 is utilized by an operator to insert the overall anti-rotation assembly 100 into the illustrated installed position and to remove the anti-rotation assembly 100 from the steering column 45 to allow rotation of the steering column 45. The handle 104 may be formed in any suitable shape to facilitate grasping by an operator. For example, the handle may be generally perpendicular to the elongated segment 110 in some embodiments.

Figure 3:
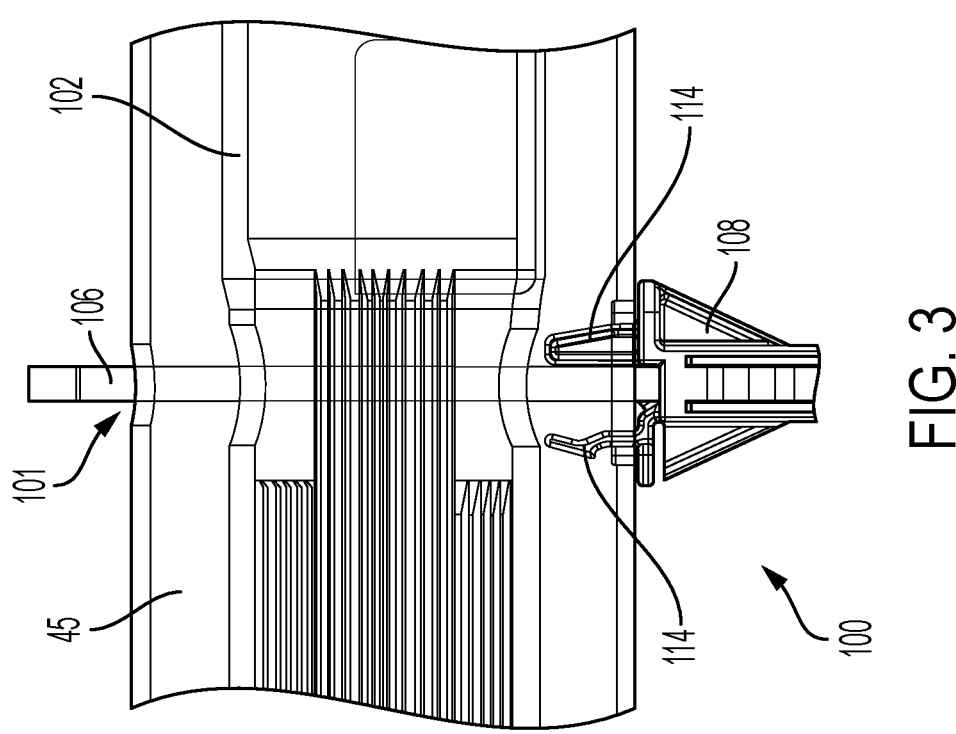
FIG. 3 is an elevation view of the steering column anti-rotation assembly.

As shown in FIG. 3, with continued reference to FIG. 2, the lock pin 106 has a first end region disposed within the housing segment 108. A second end region of the lock pin 106 extends into and through the hole 101 defined by the steering shaft 102 and the steering column 45 in the installed position of the anti-rotation assembly 100. The bottom of steering shaft 102 includes an opening that the lock pin 106 abuts during loading. Therefore, the upper hole 101 is not necessary in some embodiments and its presence depends on load bearing requirements. In the installed position, a pair of tabs 114 of the housing segment 108 extend into the hole 101. The pair of tabs 114, as well as the second end of the lock pin 106, each have a tapered portion at their respective ends to facilitate guided insertion into the hole 101. At least one of the tabs are resiliently attached to the remainder of the housing segment 108 to allow deflection during insertion into the hole 101. The tabs 114 are shaped to prevent inadvertent removal of the anti-rotation assembly 100 from the hole 101.

In some embodiments, the lock pin 106 is formed of a metal, but other rigid materials are contemplated as being suitable to prevent rotation of the steering column 45. In some embodiments, the handle portion 104 is formed of plastic, but alternative materials are contemplated as being suitable to retain the lock pin 106.

Figures 4, 5, 6:
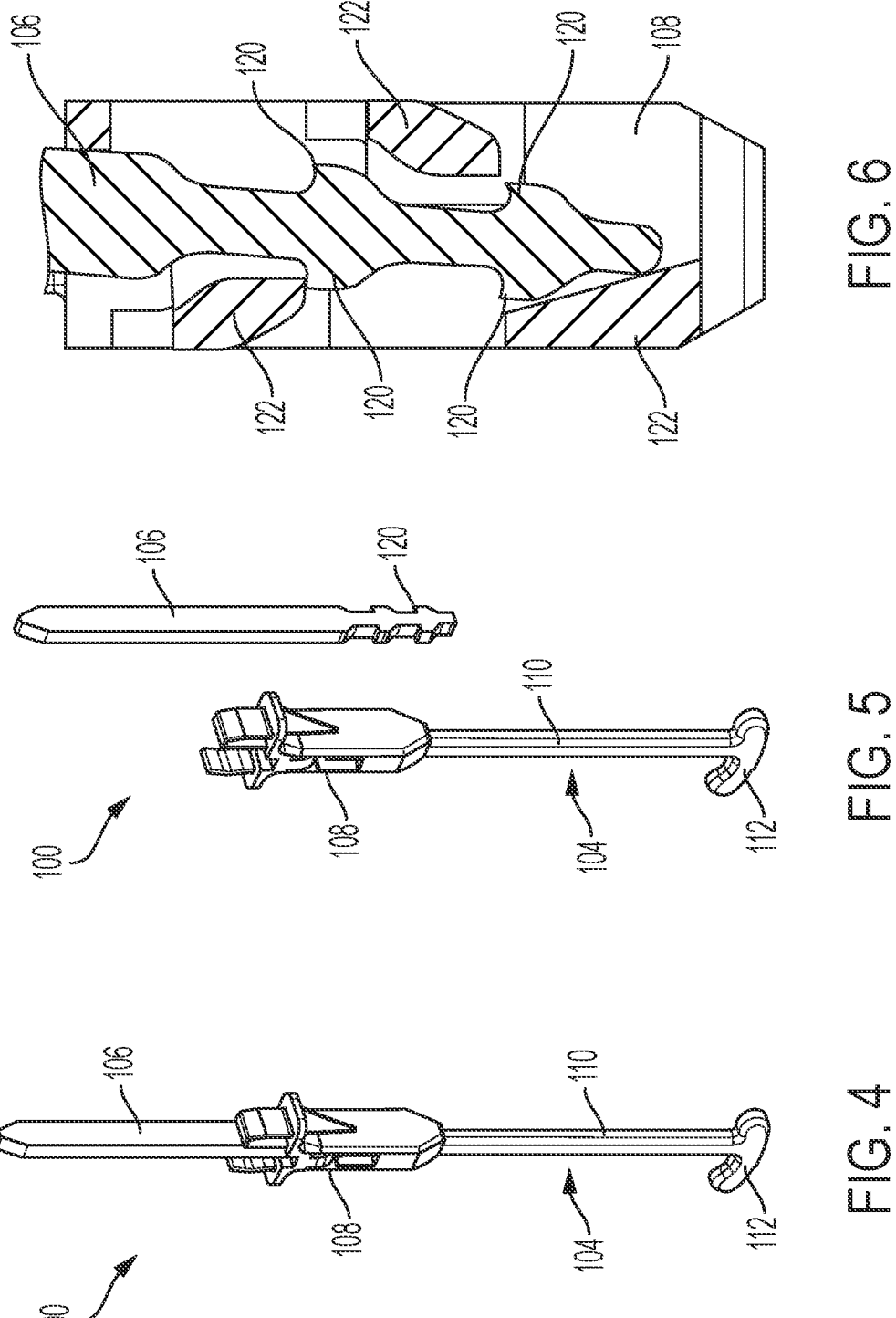
FIG. 4 is a perspective view of the steering column anti-rotation assembly in an assembled condition.
FIG. 5 is a perspective view of the steering column anti-rotation assembly in a disassembled condition.
FIG. 6 is a cross-sectional view of a portion of the steering column anti-rotation assembly.

Referring now to FIGS. 4 and 5, the anti-rotation assembly 100 is shown separate from the steering column 45. As illustrated in the disassembled condition (FIG. 5), the lock pin 106 includes a plurality of barbs 120 proximate the first end region of the lock pin 106. The barbs 120 are positioned within the housing segment 108 of the handle portion 104 when in the assembled position (FIG. 4). As shown in FIG. 6, the barbs 120 interact with a plurality of staggered retention features 122 located within the housing segment 108 of the handle portion 104. The retention features 122 may be tabs or any other suitable protrusion which is shaped to prevent withdrawal of the barbs 120 when the lock pin 106 is inserted into the housing segment 108. As shown, the lock pin 104 may be adjusted to angle the lock pin 104 to allow the barbs 120 to move past the retention features 122 for withdrawal of the lock pin 106 from the handle portion 104. Tipping of the elongated segment 110 is promoted by the offset of the handle 112 relative to the longitudinal axis of the elongated segment 110.

The barbs 120 and the retention features 122 may be shaped in any complementary manner that ensures retention of the lock pin 106 within the housing segment 108.

Figure 8:
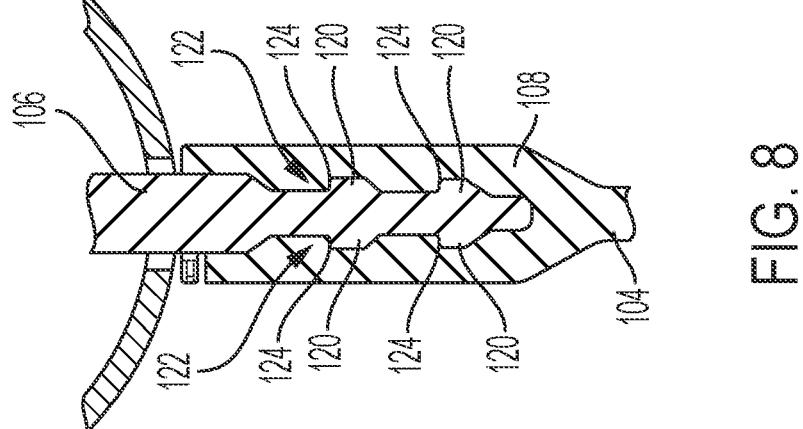
FIG. 8 is an elevation, cross-sectional enlarged view of a portion of FIG. 8.
Figure 7:
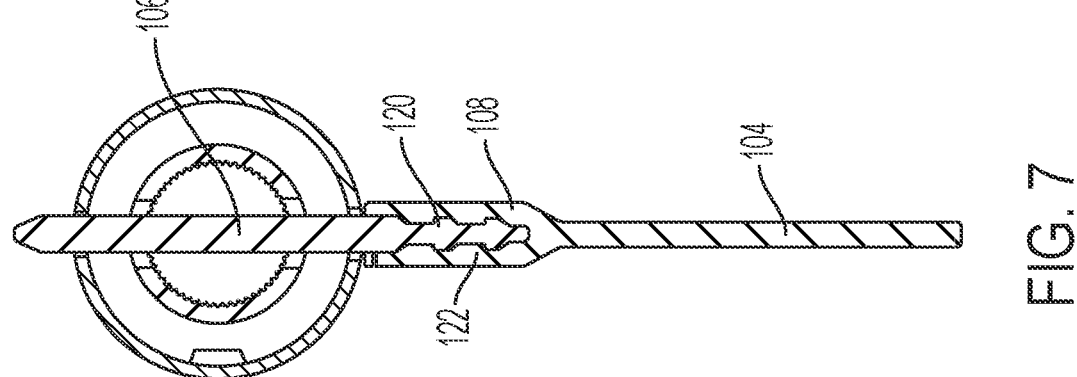
FIG. 7 is an elevation, cross-sectional view of the steering column anti-rotation assembly in the installed position.

Referring now to FIGS. 7 and 8, a cross-section of the barbs 120 disposed within the housing segment 108 is shown. The barbs 120 extend radially outwardly from the main body of the lock pin 106 and terminate at a tip 124 which is seated adjacent to one of the retention features 122. As noted above, the retention features 122 may be staggered in the longitudinal direction of the housing segment 108 or may be positioned in the manner shown in FIGS. 8 and 9.

Figures 9, 10:
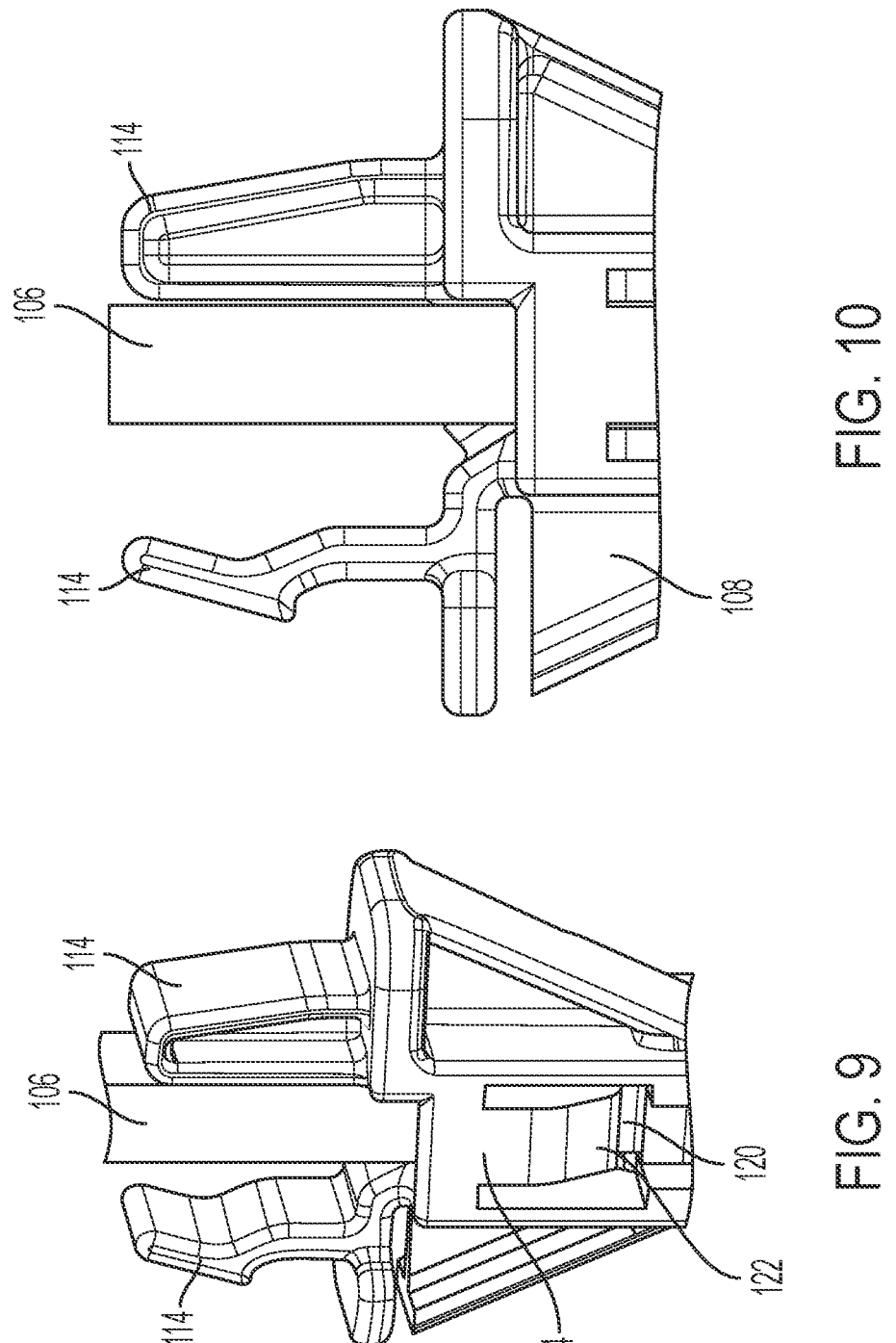
FIG. 9 is a perspective view of a portion of the steering column anti-rotation assembly.
FIG. 10 is an elevation view of a portion of the steering column anti-rotation assembly.

Referring now to FIGS. 9 and 10, the pair of tabs 114 are shown in greater detail. As discussed above, at least one of the tabs 114 is resiliently connected to the housing segment 108 to allow the tab(s) to flex upon insertion into the hole 101 of the steering column 45.

The embodiments disclosed herein limit the length of the lock pin 106 to the load bearing required length to meet customer requirements, with a small additional barbed portion for attachment to the handle portion 104. Therefore, the lock pin 106 portion of the anti-rotation assembly 100 is much shorter than the overall length of the anti-rotation assembly 100, thereby reducing material and cost. In some embodiments, the length of the lock pin 106 is less than three-fourths (¾) of the length of the overall anti-rotation assembly 100. In other embodiments, the length of the lock pin 106 is less than one-half (½) of the length of the overall anti-rotation assembly 100. In some embodiments, the length of the lock pin 106 is less than the length of the handle portion 104. Additionally, the lock pin 106 may be inserted from either opening of the hole 101, i.e. 0 degrees or 180 degrees of axial rotation.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. An anti-rotation assembly for a vehicle steering column comprising:

a handle portion extending from a first end to a second end, the first end having a handle and the second end having a housing segment; and a lock pin, wherein the lock pin extends from a first end to a second end, the first end disposed within the housing segment of the handle portion and the second end extending through a hole defined by the vehicle steering column to rotationally lock the vehicle steering column, wherein the first end of the lock pin includes a plurality of barbs, wherein at least one of the barbs is in contact with a plurality of retention features located within the housing segment of the handle portion to retain the lock pin within the housing segment, wherein the plurality of retention features are axially staggered within the housing segment.

2. The anti-rotation assembly of claim 1, wherein the lock pin has a length that is less than a length of the handle portion.

3. The anti-rotation assembly of claim 1, wherein the lock pin has a length that is less than three-fourths ($\frac{3}{4}$) of a length of the anti-rotation assembly.

4. The anti-rotation assembly of claim 1, wherein the lock pin has a length that is less than one-half ($\frac{1}{2}$) of a length of the anti-rotation assembly.

5. The anti-rotation assembly of claim 1, wherein the handle portion is formed of plastic and the lock pin is formed of metal.

6. The anti-rotation assembly of claim 1, wherein the second end of the lock pin is tapered for insertion into the hole defined by the vehicle steering column.

7. The anti-rotation assembly of claim 1, wherein the handle extends perpendicularly relative to the longitudinal direction of the handle portion.

8. An anti-rotation assembly for a vehicle steering column comprising:

a handle portion extending from a first end to a second end, the first end having a handle and the second end having a housing segment; and a lock pin, wherein the lock pin extends from a first end to a second end, the first end disposed within the housing segment of the handle portion and the second end extending through a hole defined by the vehicle steering column to rotationally lock the vehicle steering column, wherein the second end of the handle portion includes at least one resilient tab, the at least one resilient tab deflectable upon insertion through the hole defined by the vehicle steering column, wherein the at least one resilient tab is tapered for insertion into the hole defined by the vehicle steering column.

9. An anti-rotation assembly for a vehicle steering column comprising:

a handle portion extending from a first end to a second end, the first end having a handle and the second end having a housing segment; and a lock pin, wherein the lock pin extends from a first end to a second end, the first end disposed within the housing segment of the handle portion and the second end extending through a hole defined by the vehicle steering column to rotationally lock the vehicle steering column, wherein the first end of the lock pin includes a plurality of barbs, wherein at least one of the barbs is in contact with a plurality of retention features located within the housing segment of the handle portion to retain the lock pin within the housing segment, wherein the lock pin has a length less than three-fourths ($\frac{3}{4}$) of a length of the handle portion, wherein the plurality of retention features are axially staggered within the housing segment.

10. An anti-rotation assembly for a vehicle steering column comprising:

a handle portion extending from a first end to a second end, the first end having a handle and the second end having a housing segment; and a lock pin, wherein the lock pin extends from a first end to a second end, the first end disposed within the housing segment of the handle portion and the second end extending through a hole defined by the steering column to rotationally lock the vehicle steering column, wherein the first end of the lock pin includes a plurality of barbs, wherein at least one of the barbs is in contact with a plurality of retention features located within the housing segment of the handle portion to retain the lock pin within the housing segment, wherein the lock pin has a length less than three-fourths ($\frac{3}{4}$) of a length of the handle portion, wherein the second end of the handle portion includes at least one resilient tab, the at least one resilient tab deflectable upon insertion through the hole defined by the vehicle steering column, wherein the at least one resilient tab is tapered for insertion into the hole defined by the vehicle steering column.

11. The anti-rotation assembly of claim 10, wherein the lock pin has a length that is less than a length of the handle portion.

12. The anti-rotation assembly of claim 10, wherein the handle portion is formed of plastic and the lock pin is formed of metal.

13. The anti-rotation assembly of claim 10, wherein the second end of the lock pin is tapered for insertion into the hole defined by the vehicle steering column.

14. The anti-rotation assembly of claim 10, wherein the second end of the handle portion includes at least one resilient tab, the at least one resilient tab deflectable upon insertion through the hole defined by the vehicle steering column.

15. The anti-rotation assembly of claim 10, wherein the handle extends perpendicularly relative to the longitudinal direction of the handle portion.

* * * * *